United States Patent [19]

Kobetsky

[11] Patent Number: 5,616,082

[45] Date of Patent: Apr. 1, 1997

[54] APPARATUS FOR ASSEMBLING A FASTENER TO A WASHER

[75] Inventor: Robert G. Kobetsky, Chicago, Ill.

[73] Assignee: Illinois Tool Works Inc., Glenview, Ill.

[21] Appl. No.: 410,848

[22] Filed: Mar. 27, 1995

[51] Int. Cl.$^6$ ..................................................... B23P 19/08
[52] U.S. Cl. .................................. 470/49; 470/3
[58] Field of Search .................. 470/2, 3, 4, 49, 470/50

[56] References Cited

U.S. PATENT DOCUMENTS

| | | | |
|---|---|---|---|
| 3,750,206 | 8/1973 | Pomernacki | 470/50 |
| 4,058,866 | 11/1977 | Foster | 470/50 |
| 4,237,605 | 12/1980 | Jung et al. | 470/4 |
| 4,453,308 | 6/1984 | Jackson | 470/4 |
| 4,470,194 | 9/1984 | Cambiaghi et al. | 470/4 |

*Primary Examiner*—Lowell A. Larson
*Assistant Examiner*—Thomas C. Schoeffler
*Attorney, Agent, or Firm*—Schwartz & Weinrieb

[57] ABSTRACT

An apparatus for assembling a fastener blank to a washer including a mechanism for supplying washers in a sequential manner from unoriented bulk to a desired oriented position and a mechanism for supplying fastener blanks having a shank and a head to a desired oriented position. The apparatus further includes an adjustable fastener driving mechanism for gripping individual fasteners by the shank from the fastener supply mechanism and inserting the fastener shank within an aperture of a respective washer with a very high degree of accuracy and low rate of rejection to accommodate fastener blanks having mis-shaped heads or heads which are off-center or off square with respect to the shank.

19 Claims, 3 Drawing Sheets

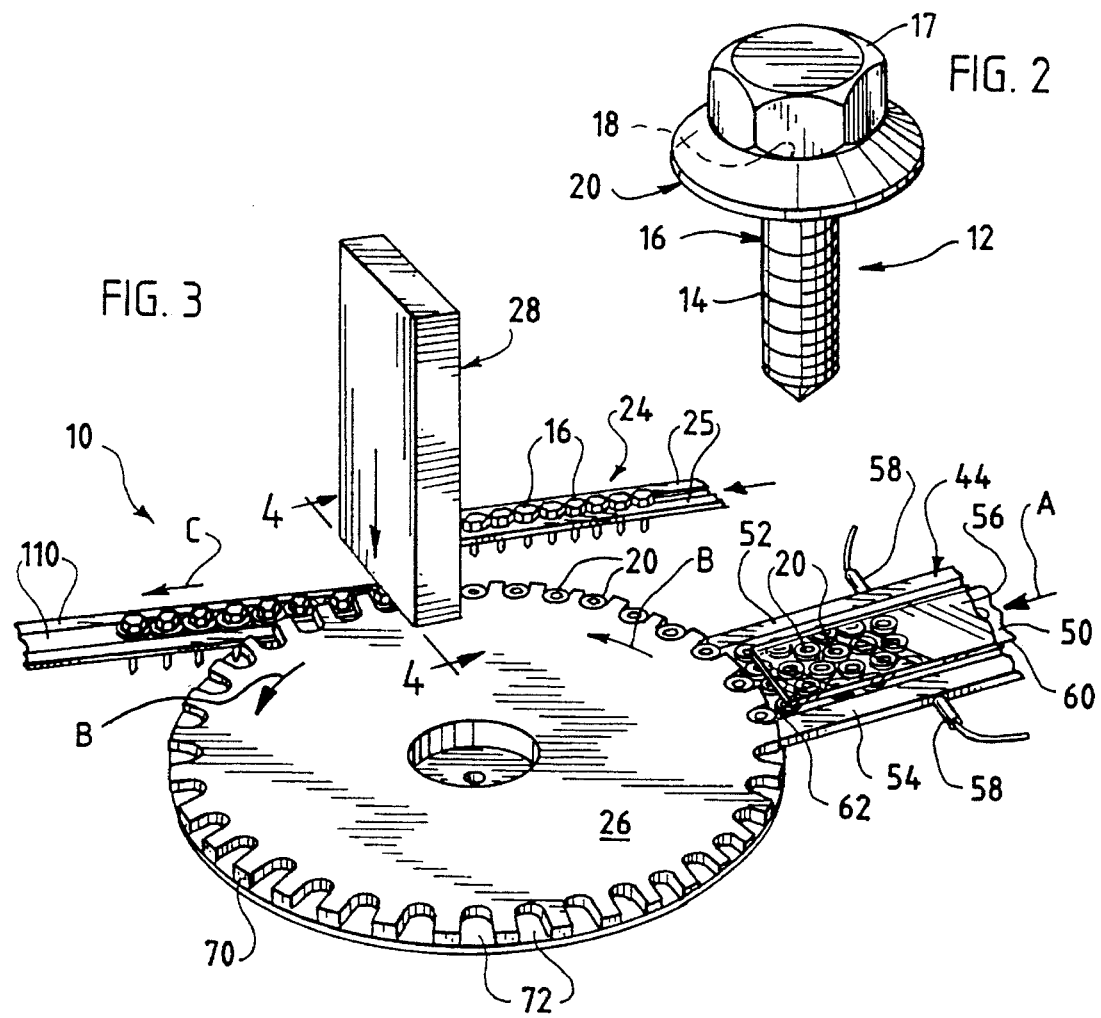
FIG. 2
FIG. 3
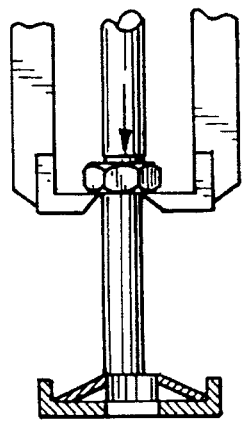
FIG. 5 PRIOR ART
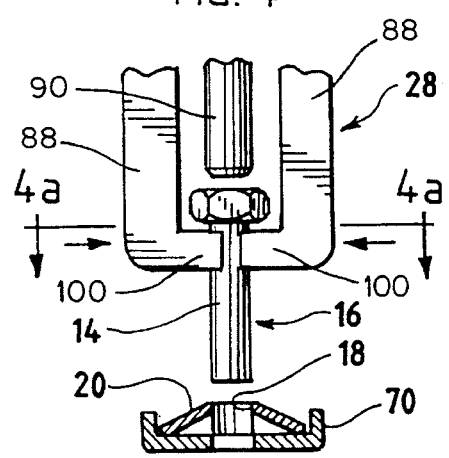
FIG. 4
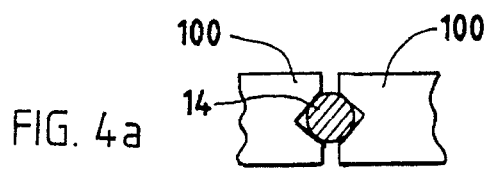
FIG. 4a

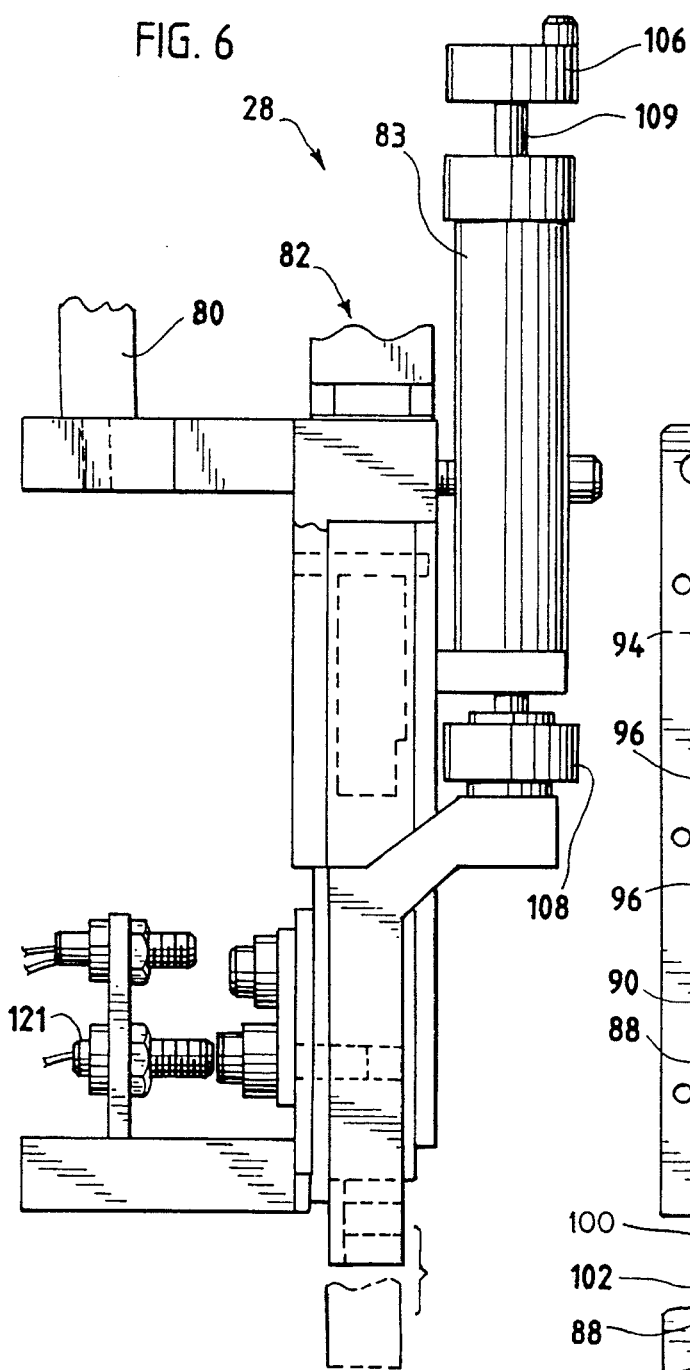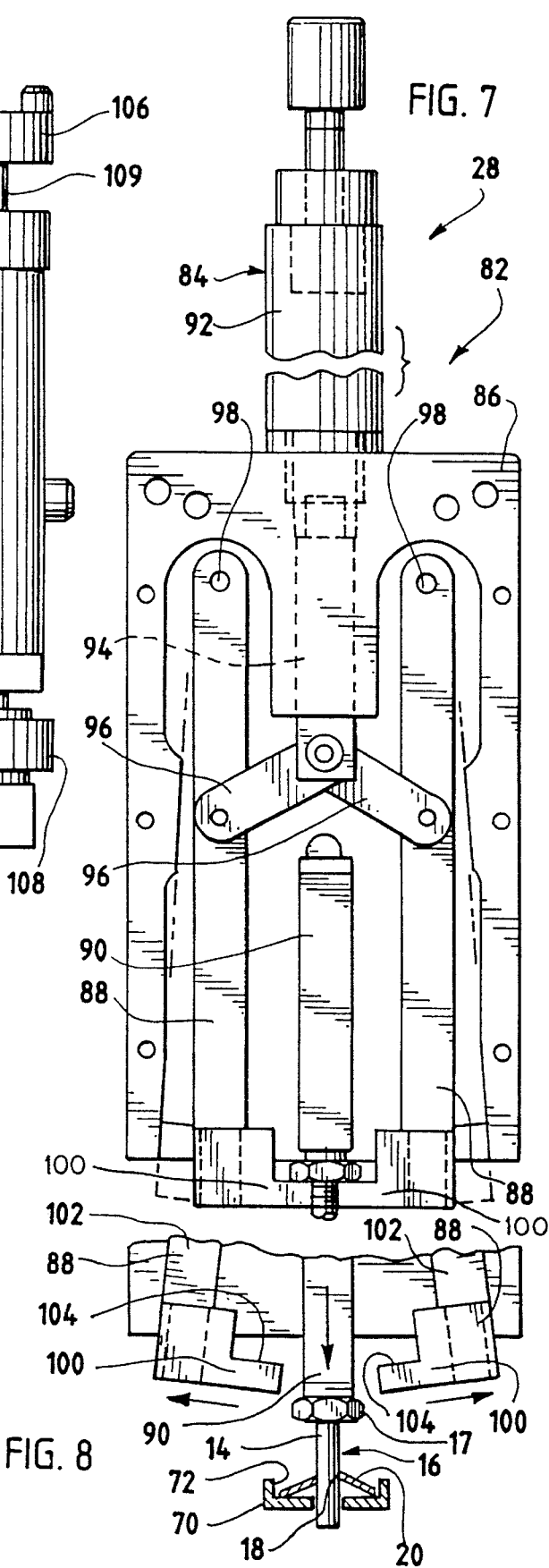

APPARATUS FOR ASSEMBLING A FASTENER TO A WASHER

FIELD OF THE INVENTION

The present invention relates generally to an apparatus for assembling fastener units, and more particularly, to a high speed apparatus for inserting a shank of a fastener blank within an aperture of a respective washer and then threading the shank where the apparatus can accommodate fastener blanks having heads that are slightly eccentric, off-center, or out of square with respect to the shank.

BACKGROUND OF THE INVENTION

In manufacturing a fastener such as a screw or bolt, one end of a section of metal wire or rod is typically axially compressed with a punch or the like with sufficient force to expand the end portion of the wire radially outwardly so as to form a head thereon. The shank is then passed through a thread roller to provide the desired threads.

During axial compression of the wire, the metal tends to randomly expand outwardly, substantially without control. This random expansion occasionally provides a fastener head that is slightly out of round and/or off-center and/or off square with respect to the central axis of the shank which can present problems in future manufacturing processes and sometimes during use.

In many applications it also is desirable to provide a fastener unit having a fastener and a pre-attached washer. The washer is usually inserted on the shank of a fastener or screw blank before the threads are formed on the shank. An example of an apparatus for high speed assembly of a washer to a shank of a fastener blank is illustrated in U.S. Pat. No. 3,750,206 which is assigned to the present assignee and is hereby incorporated by reference.

In that patent, washers and fastener blanks are sequentially advanced for insertion of the shank of the fastener blank through the aperture of the washer. The shank is then threaded for a desired application, which also retains the washer on the shank, and the finished fastener unit is off-loaded for further processing and/or packaging.

Although such an apparatus is quite effective in assembling fastener units, it employs a complex mechanical design that does not positively grip the fastener blank for accurate placement but relies on a guide mechanism and associated components for placement of the fastener shank within the washer. The guide mechanism and associated components are susceptible to misalignment over time which can reduce the efficiency of the apparatus if not monitored and adjusted periodically.

Fastener blank transporting mechanisms have also been developed that grip the head or the underside of the head of the fastener blank, as opposed to the shank, and position the shank for placement within a washer. An example of such a mechanism is illustrated in FIG. 5.

Due to the imprecision in the manufacture of the fastener shanks and heads to form the fastener blanks, however, such existing mechanisms do not perform to desired expectations. This is primarily due to the fact that the mechanism grips the fastener heads or the undersides of the fastener heads which will not enable the shank to be inserted within the washer if the head is slightly eccentric, off-center, or off square with respect to the shank, or if other similar manufacturing defects exist.

OBJECT OF THE INVENTION

It therefore would be desirable to provide an apparatus for assembling a fastener blank to a washer where the apparatus inserts a shank of a fastener blank within a respective washer aperture with a very high degree of accuracy and control and corresponding low rate of rejection and which can accommodate fastener blanks having mis-shaped heads or heads which are slightly off-center or off square with respect to the shank.

SUMMARY OF THE INVENTION

The present invention provides an apparatus for high speed assembly of fastener blanks to washers. The apparatus includes a mechanism for supplying washers in a sequential manner from unoriented bulk to a desired oriented position as well as a mechanism for supplying fastener blanks having a head and a shank to a desired oriented position. A fastener transfer or driving mechanism is also provided for gripping an individual fastener blank by the shank from the fastener supply mechanism and inserting the shank within an aperture of a respective washer with a very high degree of accuracy and corresponding low rate of rejection.

Since the fastener transfer mechanism grips each fastener shank, rather than the head, the apparatus can accommodate fastener blanks which may be mis-shaped. For example, fastener heads which are eccentric or otherwise out of round or that are formed off-center or off square with respect to the central axis of the shank can be readily handled without difficulty by the present apparatus.

The apparatus can also include a thread roller for providing threads on the shank of the fastener blank after the shank is inserted in the washer aperture. In order to regulate the supply of washers or blanks to the oriented position, one or more sensors can be included which momentarily interrupt the flow of washers or blanks if they begin to back up.

The apparatus further includes a mechanism for determining whether a particular shank of a fastener blank has been properly inserted within a respective washer aperture. If the shank is not properly inserted, the mechanism resets the fastener driving mechanism to undergo additional attempts at inserting the shank within the washer aperture before ejecting the fastener from the apparatus.

BRIEF DESCRIPTION OF THE DRAWINGS

Other features and advantages of the present invention will become readily apparent from the following description when considered in connection with the accompanying drawings wherein like reference characters designate like or corresponding parts throughout the several views, and wherein:

FIG. 2 is a perspective view of a fastener unit including a washer and a fastener blank having a head and a shank where the shank was inserted within an aperture of the washer and then threaded by the apparatus of the present invention;

FIG. 3 is a perspective schematic view of a portion of the apparatus of the invention generally illustrating washers and fastener blanks being assembled;

FIG. 4 is an enlarged view of a portion of the fastener transfer or driving mechanism of the invention illustrating gripping of a fastener blank by the shank thereof;

FIG. 4a is an enlarged partial cross-sectional view of the fastener transfer mechanism taken along line 4a—4a of FIG. 4;

FIG. 5 is an enlarged view of a portion of a prior art fastener transfer or driving mechanism illustrating gripping of a fastener blank by the underside of the head portion;

FIG. 6 is an enlarged side elevational view of the fastener transfer mechanism of the invention;

FIG. 7 is an enlarged front elevational view, in partial section, of a portion of the fastener transfer mechanism of the invention illustrated gripping a shank of a fastener blank just prior to insertion of the shank within a washer aperture; and FIG. 8 is a front elevational view of a portion of the transfer mechanism of FIG. 7 illustrating release of the shank of the fastener blank just after insertion of the shank within a washer aperture.

DESCRIPTION OF THE PREFERRED EMBODIMENT

Figure 1:
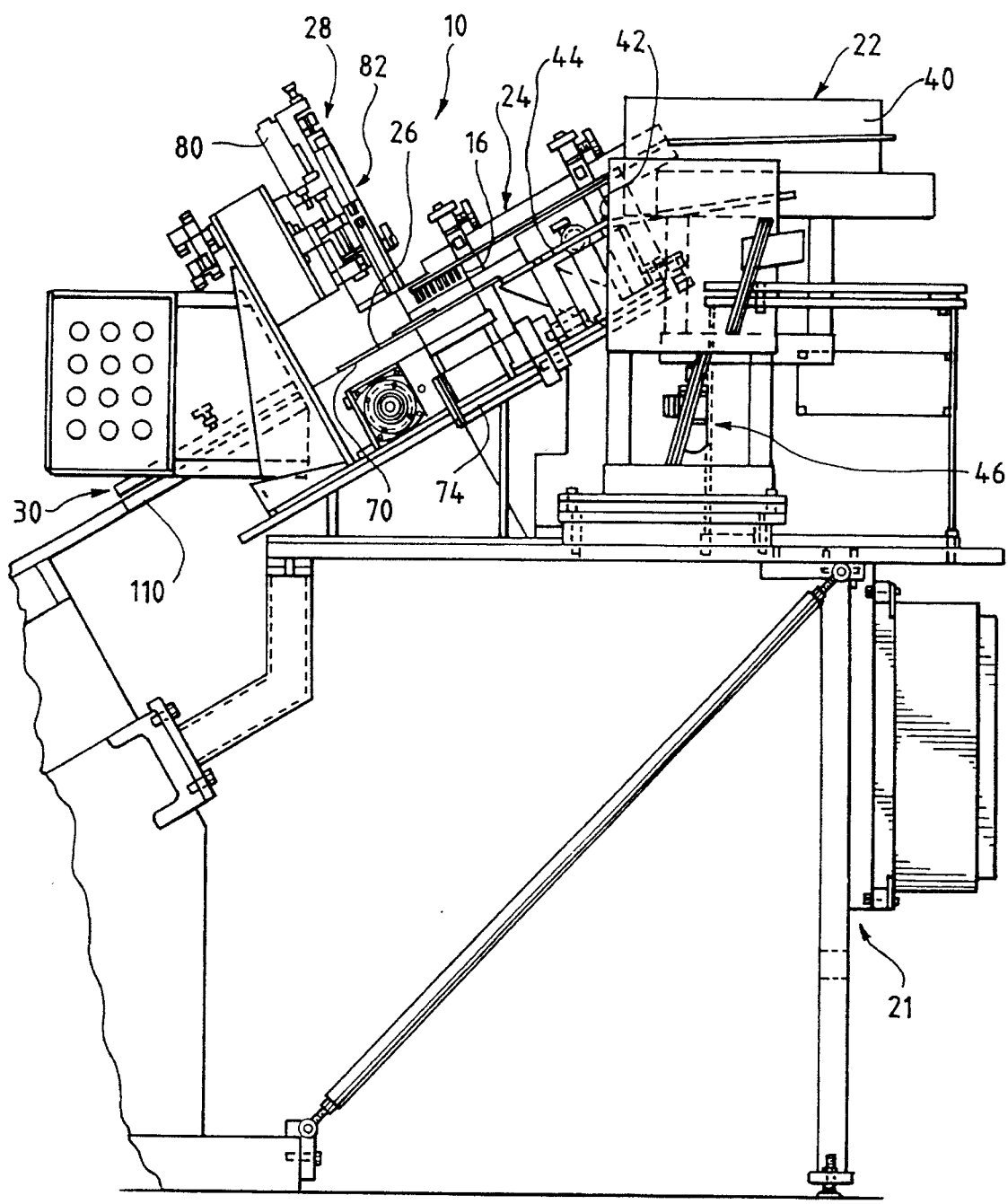
FIG. 1 is a side elevational view of the fastener unit assembling apparatus of the present invention with portions thereof illustrated in dotted lines.

While the present invention is susceptible of embodiment in various forms, there is shown in the drawings and will hereinafter be described a presently preferred embodiment with the understanding that the present disclosure is to be considered as an exemplification of the invention and is not intended to limit the invention to the specific embodiment illustrated.

For ease of description, the apparatus of the present invention is described in the normal, upright, operating position and terms such as upper, lower, horizontal or the like are utilized with reference to this position. It will be understood, however, that the apparatus of the invention may be manufactured, stored, transported and sold in an orientation other than the position described.

Referring to FIG. 1, the fastener blank and washer assembling apparatus of the invention is designated generally by the reference numeral 10. The apparatus 10 is utilized for high speed assembly of a fastener unit 12 illustrated in FIG. 2.

In use, the apparatus 10 inserts a shank 14 of a fastener blank 16, which also includes a head 17, into an aperture 18 of a washer 20. The apparatus 10 then threads the shank 14 for a particular application of the fastener unit 12 and to retain the washer 20 on the shank 14. It is to be understood, however, that the apparatus 10 can be utilized for a variety of applications without departing from the teachings of the present invention.

The fastener blank 16 and washer 20 are preferably formed from metal and can include a protective coating thereon if desired. The washer 20 is preferably formed as a lock washer, such as a conical or spring type lock washer, or any other type of washer. The particular size, shape and material used to form the fastener blank 16 or the washer 20, however, can vary.

As FIG. 1 illustrates, the apparatus 10 is preferably supported on a frame 21 and includes suitable electrical controls and associated components. It is to be understood that the particular details of the frame 21 and associated electrical controls and components can vary without departing from the teachings of the present invention.

The apparatus 10 substantially includes a vibratory washer hopper and guide mechanism 22, a fastener or screw blank supply and guide mechanism 24, a rotary washer feed device 26, a fastener blank or screw insertion device 28, and a thread forming or rolling mechanism 30. Details of the operation of the apparatus 10 either will be provided herein or can be readily discerned by review of U.S. Pat. No. 3,750,206 incorporated by reference above which in certain aspects is similar in operation to the apparatus 10 except as described herein.

Briefly, in operation, as FIGS. 1 and 3 illustrate, washers 20 are provided from unoriented bulk to the vibratory washer hopper and guide mechanism 22. The washer mechanism 22 transports washers 20 in the direction of arrow "A" to the rotary washer feed device 26 which moves the washers 20 in a circular path in the direction of arrow "B" to a position beneath the fastener blank insertion device 28.

At the same time, fastener blanks 16 are provided to the fastener blank supply and guide mechanism 24. The fastener blank mechanism 24 sequentially transports fastener blanks 16 to a position beneath the fastener insertion device 28 and just slightly above a respective washer 20 positioned on the rotary washer feed device 26.

As FIGS. 4 and 7 illustrate, the fastener insertion device 28 then grips the fastener blank 16 by the shank 14 and inserts a distal end of the shank 14 within the aperture 18 of the washer 20. After insertion, the fastener blank insertion device 28 then releases the shank 14 of the fastener 16 as illustrated in FIG. 8 and drives the shank 14 downward until the head 17 of the fastener blank 16 is adjacent the washer 20. Thereafter, the cycle is repeated for subsequent fastener blanks 16 and washers 20.

The assembled fastener unit 12 comprising the fastener blank 16 and the washer 20 is then transported in the direction of arrow "C" in FIG. 3 to the thread forming mechanism 30 where the shank 14 is threaded for a desired application which also maintains the washer 20 on the shank 14. After threading, the fastener unit 12 is transported for subsequent processing and/or packaging.

Details of the structure of the apparatus 10 will now be provided. For ease of description and understanding, each of the major components of the apparatus 10 will be described under separate headings.

VIBRATORY WASHER HOPPER AND GUIDE MECHANISM

The vibratory washer hopper and guide mechanism 22 substantially includes a hopper 40 and an exit chute 42, illustrated in FIG. 1, where the exit chute 42 is in operable communication with a washer feed chute or guide ramp 44, illustrated in FIG. 3. The hopper 40 is vibrated by a suitable mechanical vibrating member 46 and, as it vibrates, transports a plurality of washers 20 from unoriented bulk from the base of the hopper 40 to the exit chute 42 where they are sequentially transported to the washer guide ramp 44.

The particular structure and operation of the hopper 40, exit chute 42 and vibrating member 46 can vary so long as they provide washers 20 to the washer guide ramp 44 as desired.

As FIG. 3 illustrates, the washer guide ramp 44 includes a substantially planar bottom member 50, a pair of opposing edge guides 52 and 54, a substantially planar top member 56 and a sensor 58. The bottom member 50 is preferably formed from a rigid material, such as metal, is positioned with a predetermined angle with respect to the horizontal and includes a first top end 60 and a second opposite bottom end 62. Preferably, the planar top member 56 is positioned above the bottom member 50 at a distance substantially corresponding to the thickness of the washers 20 to prevent stacking of the washers 20.

The top end 60 is positioned to receive washers 20 directly from the exit chute 42 of the hopper 40. Due to the angle of the bottom member 50 with respect to the horizontal, gravity enables the washers 20 to advance in the direction of arrow "A" in FIG. 3 from the top end 60, beneath the planar top member 56 to the bottom end 62.

The bottom end 62 is positioned for operable communication with the rotary washer feed device 26 as described below. In order to prevent accumulation of excess washers 20 on the washer guide ramp 44, the sensor 58, which preferably is an optical sensor, shuts off the vibrating member 46 of the hopper 40 when the level of washers 20 on the washer guide ramp 44 reaches the position of the sensor 58.

The particular sensor 58 and its position with respect to the washer guide ramp 44 can vary so long as it functions as described herein. Additionally, any surplus washer blanks 20 are allowed to overflow past the edge guide 52 and back into the feeder bowl supply or hopper 40.

FASTENER BLANK SUPPLY AND GUIDE MECHANISM

The fastener or screw blank supply and guide mechanism 24 substantially includes two parallel guide rails 25 that supply fastener blanks 16 to a desired oriented position for gripping by the fastener blank insertion device 28. The guide rails 25 are adjustably positioned to accept the shank 14 of the fastener blanks 16 therebetween with the heads 17 resting and sliding on a top surface of each one of the guide rails 25.

Due to the angle of the guide rails 25 with respect to the horizontal, the fastener blanks 16 are transported along the rails 25 by gravity. One end of the guide rails 25 can be in operable communication with a bulk fastener feeding device (not illustrated), such as the vibratory washer hopper and guide mechanism 22 or similar device, while the opposite end of the guide rails 25 includes an escapement member (not illustrated) for preventing the fastener blanks 16 from sliding off the guide rails 25 before being gripped by the fastener blank insertion device 28 as described below.

ROTARY WASHER FEED DEVICE

Again referring to FIGS. 1 and 3, the rotary washer feed device 26 substantially includes an upwardly inclined disc 70 having a plurality of washer accommodating pockets 72 about its periphery. The disc 70 is driven by a suitable drive motor 74 at a predetermined speed which is synchronized with respect to the other components of the apparatus 10.

When conical washers 20 are utilized, they must be oriented with their crown side facing upward (conical side facing downward) so that the crown side faces the head 17 when positioned on the fastener blank 16. In order to provide proper orientation, the mechanism illustrated in the above-referenced U.S. Pat. No. 3,750,206, or any other type of mechanism can be utilized.

As the washers 20 reach the bottom 62 of the washer guide ramp 44, they feed into a respective washer pocket 72 on the disc 70. The disc 70 then transports the washers 20 in succession in the direction of arrow "B" in FIG. 3 to a position beneath the fastener blank insertion device 28 where a shank 14 of a fastener blank 16 is inserted in the aperture 18 of a washer 20 as described herein.

FASTENER BLANK INSERTION DEVICE

As FIGS. 1 and 6 illustrate, the fastener blank insertion device 28 is driven up and down by an air cylinder piston rod 80 connected to the frame of the apparatus 10. The blank insertion device 28 substantially includes a fastener blank gripping and drive assembly 82 and an air cylinder actuating piston 83 along with associated electrical or other control apparatus.

As FIG. 7 illustrates, the fastener blank gripping and drive assembly 82 preferably includes an actuating mechanism 84, a body portion 86, a pair of fastener blank gripping arms 88, and a fastener blank drive rod 90 which is driven up and down by the actuating piston 83 as described below. The gripping and drive assembly 82 as well as the actuating piston 83 include several adjustments as described below to accommodate a variety of fastener blanks 16 and washers 20 of different sizes.

The actuating mechanism 84 includes a pneumatic drive cylinder 92 secured to the body portion 86 which includes an associated drive piston 94. A distal end of the drive piston 94 is connected to a pair of link arms 96 each of which is connected for rotation to a respective gripping arm 88.

To provide the desired precise movement for gripping each fastener blank 16, each gripping arm 88 is rotatably mounted with respect to the body portion 86 at a first proximal end 98. Additionally, each gripping arm 88 includes a shank gripping portion 100 at its opposite distal end 102 which includes a relieved portion 104 to accommodate the fastener head 17.

To initially grip a shank 14 of a fastener blank 16 positioned beneath the fastener blank insertion device 28, the drive piston 94 is driven slightly downward with respect to FIG. 7 to a first open position illustrated in dotted lines. In this first open position the gripping arms 88 are slightly open to enable a shank 14 of a fastener blank 16 to be positioned between the gripping arms 88.

Once a shank 14 is positioned between the gripping arms 88, the drive piston 94 is retracted upward to the position illustrated in solid lines in FIG. 7. During retraction of the drive piston 94, the link arms 96 pull the gripping arms 88 which pivot about their proximal ends 98 and grip the shank 14 with the shank gripping portions 100 (shown in FIG. 4a).

This gripping of the shank 14 serves to positively locate the shank 14 within the apparatus 10 with a very high degree of accuracy and enables control over the precise orientation and movement of the fastener blanks 16. Once so located, insertion of the shank 14 within an aperture 18 of an associated washer 20 can be readily accomplished.

To insert a shank 14 of a fastener blank 16 into an aperture 18 of a washer 20, the piston 80 drives the entire fastener blank drive assembly 82 downward toward a washer 20 precisely positioned beneath the shank 14 within a respective pocket 72 on the disc 70. Once the shank 14 is positioned within the aperture 18 of the washer 20, the drive piston 94 is moved downward to release the shank 14 from within the gripping arms 88.

As FIG. 8 illustrates, continued downward movement of the drive piston 94 fully opens the gripping arms 88. At this time, air cylinder actuating piston 83 is operated to cause the drive rod 90 to drive the head 17 against the upward face of the washer 20 which occurs substantially simultaneously with the release of the shank 14. The actuating piston 83 then moves upward while the drive piston 94 retracts to the first open position illustrated in dotted lines in FIG. 7 as the entire insertion device 28 moves upward to accept a shank 14 of a subsequent fastener blank 16 and repeat the cycle.

As FIG. 6 illustrates, the actuating piston 83, which is located with respect to the fastener blank drive assembly 82, can be adjusted by positioning of a stop member 106. The stop member 106 is secured to a shaft 109 which moves with the actuating piston 83.

The stop member 106 sets the length of the downward stroke of the shaft 109 of the actuating piston 83 and drive rod 90 and is primarily utilized to accommodate changes in the thickness of the washers 20. Preferably, the first stop member 106 should be positioned to enable insertion of the shank 14 within the aperture 18 without squeezing the fastener head 17 and washer 20 against the disc 70.

Similarly, a second adjustable member 108 controls the upward position of the shaft 109 of the actuating piston 83. The second member 108 is used primarily to adjust for changes in the thickness of the head 17 of the fastener blank 16.

Additionally, the control apparatus of the fastener blank drive assembly 82 preferably includes a sensor (not illustrated) which senses whether a washer 20 is positioned beneath a shank 14 of a fastener blank 16 when the fastener blank 16 is positioned for driving. If there is no washer 20 present the insertion device 28 is kept from cycling and releasing a fastener blank 16 without a washer.

A proximity sensor 121 is also included with the actuating piston 83 which senses and controls the fastener blank drive assembly 82 in the event a fastener blank 16 is jammed or mis-driven. The proximity sensor 121 enables the control apparatus of the fastener blank drive assembly 82 to try three times to insert a shank 14 within an aperture 18. If not properly inserted, the fastener blank 16 is removed from the apparatus 10 and a new fastener blank 16 is obtained.

THREAD FORMING/ROLLING MECHANISM

The thread forming and rolling mechanism 30 accepts assembled fastener units 12 including fastener blanks 16 and washers 20 from the fastener blank insertion device 28 along a pair of rails 110 illustrated in FIGS. 1 and 3. The rails 110 are positioned at an angle with respect to the horizontal so that the fastener units 12 slide down the rails 110 due to gravity.

Preferably, to form the threads on the shank 14, a thread rolling mechanism (not illustrated) is positioned along the rails 110. Accordingly, as the fastener units 12 pass through the thread rolling mechanism the shank 14 is threaded as desired where the threads retain the washer 20 on the shank 14 to provide the assembled fastener unit 12 which is removed from the assembly 10 for further processing and/or packaging and shipping.

From the foregoing, it will be observed that numerous modifications and variations can be effected without departing from the true spirit and scope of the novel concept of the present invention. It will be understood that no limitation with respect to the specific embodiments is intended or should be inferred. The disclosure is intended to cover, by the appended claims, all such modifications as fall within the scope of the claims.

I claim:

1. Apparatus for assembling a fastener blank to a washer, comprising:

means for supplying a plurality of washers in a sequential manner from unoriented bulk to a desired oriented position;

means for supplying a plurality of fastener blanks wherein each one of said plurality of fasteners has a head and a shank and is disposed at a desired oriented position; and fastener driving means for gripping and supporting an individual one of said plurality of fastener blanks, disposed at said desired oriented position by said fastener supply means, by said shank, and for inserting said gripped and supported shank of said individual one of said fastener blanks within an aperture of a respective one of said washers disposed at said oriented position.

2. The apparatus as defined in claim 1 including thread roller means for providing threads on said shank of each fastener blank after insertion within said washer aperture.

3. The apparatus as defined in claim 1 including means for sensing whether a fastener blank is properly inserted within said washer aperture.

4. The apparatus as defined in claim 3 wherein said means for sensing resets said fastener driving means for additional attempts at inserting an improperly inserted fastener blank within additional washer apertures.

5. The apparatus as defined in claim 1 including means for regulating the supply of washers to said oriented position.

6. The apparatus as set forth in claim 1, wherein said fastener driving means comprises:

a body member; and a pair of fastener blank gripping arms pivotally mounted upon said body member for pivotal movement with respect to each other between a first position at which said gripping arms are pivotally moved toward each other so as to grip and support said shank of said fastener therebetween, and a second position at which said gripping arms are pivotally moved away from each other so as to permit a shank of a fastener to be inserted between said pair of gripping arms and to release said shank of said fastener once a distal non-headed tip portion of said fastener is inserted within said aperture of said respective washer.

7. The apparatus as set forth in claim 6, further comprising:

piston-cylinder actuating means mounted upon said body member; and a pair of link arms operatively connecting said pair of gripping arms to a piston member of said piston-cylinder actuating means such that upon actuation of said piston-cylinder actuating means, said pair of link arms causes said pair of gripping arms to be moved between said first and second positions.

8. The apparatus as set forth in claim 6, wherein said fastener driving means further comprises:

a drive rod for engaging said head of said fastener gripped and supported by said gripping arms; and piston-cylinder actuating means having an actuating piston for engaging said drive rod so as to cause said drive rod to drive said fastener shank through said aperture of said washer until said head of said fastener engages said washer.

9. Apparatus for assembling a fastener blank to a washer, comprising:

a vibratory bowl for housing a plurality of washers therein in an unoriented state and for sequentially transporting said washers to a first position;

a washer feed chute for transporting said plurality of washers from said first position to a second position;

a washer feed disc for sequentially transporting each one of said plurality of washers from said second position to a third position;

a fastener feed chute for sequentially transporting a plurality of fastener blanks, wherein each one of said plurality of fasteners has a head and a shank, to said third position; and fastener drive means for gripping and supporting an individual one of said plurality of fastener blanks, disposed at said third position, by said shank, and for individually transporting and inserting said gripped and supported shank of said individual one of said fastener blanks into an aperture of a respective one of said washers disposed at said third position.

10. The apparatus as defined in claim 9 including thread roller means for providing threads on said shank of each fastener blank after insertion within said aperture of said washer.

11. The apparatus as defined in claim 9 including means for sensing whether a fastener blank is properly inserted within said washer aperture.

12. The apparatus as defined in claim 11 wherein said means for sensing resets said fastener drive means for additional attempts at inserting an improperly inserted blank within additional washer apertures.

13. The apparatus as defined in claim 9 including means for regulating the supply of washers to said second position.

14. The apparatus as defined in claim 9 wherein said fastener drive means include adjustment means for accommodating different size washers.

15. The apparatus as defined in claim 9 wherein said fastener drive means include adjustment means for accommodating fastener blanks having different size shanks.

16. The apparatus as defined in claim 9 wherein said fastener drive means include adjustment means for accommodating fastener blanks having different size heads.

17. Apparatus as set forth in claim 9, wherein said fastener drive means comprises:

a body member; and a pair of fastener blank gripping arms pivotally mounted upon said body member for pivotal movement with respect to each other between a first position at which said gripping arms are pivotally moved toward each other so as to grip and support said shank of said fastener therebetween, and a second position at which said gripping arms are pivotally moved away from each other so as to permit a shank of a fastener to be inserted between said pair of gripping arms and to release said shank of said fastener once a distal non-headed tip portion of said fastener is inserted within said aperture of said respective washer.

18. Apparatus as set forth in claim 17, further comprising:

piston-cylinder actuating means mounted upon said body member; and a pair of link arms operatively connecting said pair of gripping arms to a piston member of said piston-cylinder actuating means such that upon actuation of said piston-cylinder actuating means, said pair of link arms causes said pair of gripping arms to be moved between said first and second positions.

19. Apparatus as set forth in claim 17, wherein said fastener drive means further comprises:

a drive rod for engaging said head of said fastener gripped and supported by said gripping arms; and piston-cylinder actuating means having an actuating piston for engaging said drive rod so as to cause said drive rod to drive said fastener shank through said aperture of said washer until said head of said fastener engages said washer.

* * * * *